(12) United States Patent
Jung (10) Patent No.: US 7,002,904 B2
(45) Date of Patent: Feb. 21, 2006

(54) METHOD AND APPARATUS FOR REDUCING PEAK POWER IN PARTIAL TRANSMIT SEQUENCE OFDM

(75) Inventor: Dae-Kwon Jung, Koyang-shi (KR)

(73) Assignee: Samsung Electronics Co., Ltd., (KR)

( * ) Notice: Subject to any disclaimer, the term of this patent is extended or adjusted under 35 U.S.C. 154(b) by 874 days.

(21) Appl. No.: 10/027,990

(22) Filed: Dec. 20, 2001

(65) Prior Publication Data

US 2003/0067866 A1    Apr. 10, 2003

(30) Foreign Application Priority Data

Jun. 19, 2001    (KR) ............................. 2001-35970

(51) Int. Cl.
*H04J 11/00*    (2006.01)
*H04M 3/42*    (2006.01)

(52) U.S. Cl. ............... 370/210; 370/208; 370/480; 375/260

(58) Field of Classification Search ............. 370/208, 370/210, 480; 375/210
See application file for complete search history.

(56) References Cited

U.S. PATENT DOCUMENTS

| | | | |
|---|---|---|---|
| 6,314,146 B1 * | 11/2001 | Tellado et al. | 375/346 |
| 6,424,681 B1 * | 7/2002 | Tellado et al. | 375/296 |
| 6,512,797 B1 * | 1/2003 | Tellado et al. | 375/261 |
| 6,556,557 B1 * | 4/2003 | Cimini et al. | 370/342 |

OTHER PUBLICATIONS

Muller S. H.; Huber J.B.; "OFSM with reduced peak-to-average power ratio by optimum combination of partial transmit sequences", Feb. 27, 1997, Electronics Letters, vol. 33, pp. 368-369.*

* cited by examiner

*Primary Examiner*—Alpus H. Hsu
*Assistant Examiner*—Lina Yang
(74) *Attorney, Agent, or Firm*—Dilworth & Barrese LLP (57) ABSTRACT

There is provided a PTS (Partial Transmit Sequence) OFDM (Orthogonal Frequency Division Multiplexing) scheme for reduction of a PAPR (Peak-to-Average Power Ratio). In an OFDM transmitting apparatus for peak power reduction according to the present invention, an rotational sub-block partitioner partitions an input data block of length N into M, the number of sub-block, and distributes the partitioned data of each data block in M sub-blocks one by one rotationally. M IFFTs (Inverse Fast Fourier Transformers) perform N/M-point IFFT on N/M data assigned to each of the M sub-blocks and M coefficient multipliers multiply the N/M data output from each IFFT by a predetermined coefficient to give orthogonality to the frequency components of the N/M output data. A phase factor optimizer optimizes M phase factors to minimize a PAPR using the N/M output values of each coefficient multiplier. M multipliers multiply the optimized M phase factors by the outputs of the coefficient multipliers. A transmitter sums the outputs of the M multipliers on a symbol-to-symbol basis in the same positions and transmits the sum.

13 Claims, 9 Drawing Sheets

METHOD AND APPARATUS FOR REDUCING PEAK POWER IN PARTIAL TRANSMIT SEQUENCE OFDM

BACKGROUND OF THE INVENTION

1. Field of the Invention

The present invention relates generally to reduction of a high peak-to-average power ratio (PAPR) that is a problem with OFDM (Orthogonal Frequency Division Multiplexing), and in particular, to a partial transmit sequence (PTS) used for PAPR reduction.

2. Description of the Related Art

OFDM is used as a transmission technique for digital broadcasting and will be a significant technology for future high rate multimedia wireless communications. A serious problem with OFDM is high peak power, and present known methods are deficient in providing adequate techniques that result in the reduction of the high peak power.

OFDM is a type of multi-carrier modulation scheme that shows excellent performance in a multi-path fading mobile communication environment. For this reason, OFDM attracts interest as a modulation scheme suitable for ground wave digital video broadcasting (DVB) and digital audio broadcasting (DAB). In this modulation scheme, low rate transmission is performed in parallel on multiple carriers instead of high rate transmission on a single carrier. With parallel transmission, the symbol period of multiple carrier signals is longer than that of original input data. Thus, fading does not focus on a few adjacent bits causing errors but slightly influences a plurality of parallel bits. The robustness to channel fading makes OFDM less sensitive to channel distortion.

OFDM shows a high spectral efficiency because the spectrums of subchannels are orthogonal and overlap each other. Since OFDM modulation/demodulation is implemented by IDFT/DFT (Inverse Discrete Fourier Transform/Discrete Fourier Transform), efficient digitalization of a modulator/demodulator results. Despite these advantages, OFDM has an inherent shortcoming of a high PAPR in multi-carrier modulation. A signal with a high PAPR decreases the efficiency of a linear amplifier and sets an operational point in a non-linear area for a non-linear amplifier, resulting in mutual modulation between carriers and spectrum distribution. Many methods have been suggested to reduce the PAPR.

The PAPR is defined as $$PAPR = \frac{\max_{0 \le n \le N-1} |s(nT)|^2}{E\{|s(nT)|^2\}} = \frac{\max_{0 \le n \le N-1} |x_n|^2}{E\{|x_n|^2\}} \quad (1)$$

where s(nT) is a signal sampled in intervals T, $x_n$ is the sample value of the signal, and $E\{\cdot\}$ is an operator for calculating an expected value.

A basic PAPR reduction method is to operate a linear amplifier in a linear area or to operate a non-linear amplifier in a linear area by use of a back-off. However, this method has the disadvantage of low amplifier efficiency. More simply, clipping can be used whereby if the strength of a signal is greater than a predetermined value, the difference is clipped. Clipping, furthermore, deteriorates BER (Bit Error Rate) performance because of the band distortion caused by non-linear operation. In addition, clipping generates noise in the band, decreasing spectral efficiency.

Coding also can be applied to multiple carriers for the PAPR reduction method. Extra carriers are transmitted with parity bits to reduce the PAPR. This method remarkably reduces the PAPR due to its error correction function and an additional narrow bandwidth. Yet, as more carriers are used, the size of a look-up table or a generation matrix increases, thereby increasing hardware complexity, reducing operation efficiency, and decreasing operational speed.

Two schemes showing promising PAPR reduction have recently been proposed.

One is selective mapping (SLM) and the other is partial transmit sequence (PTS). According to the SLM scheme, data of length N is multiplied by M statistically independent sequences of length N and a sequence with the lowest PAPR is transmitted selectively. Despite the requirement of M IFFT (Inverse Fast Fourier Transform) processes, the SLM scheme can reduce a PAPR greatly and be applied irrespective of the number of carriers.

On the other hand, the PTS scheme, having the advantages of the SLM scheme, is known as the most effective flexible method of reducing the PAPR without non-linear distortion.

Figure 1:
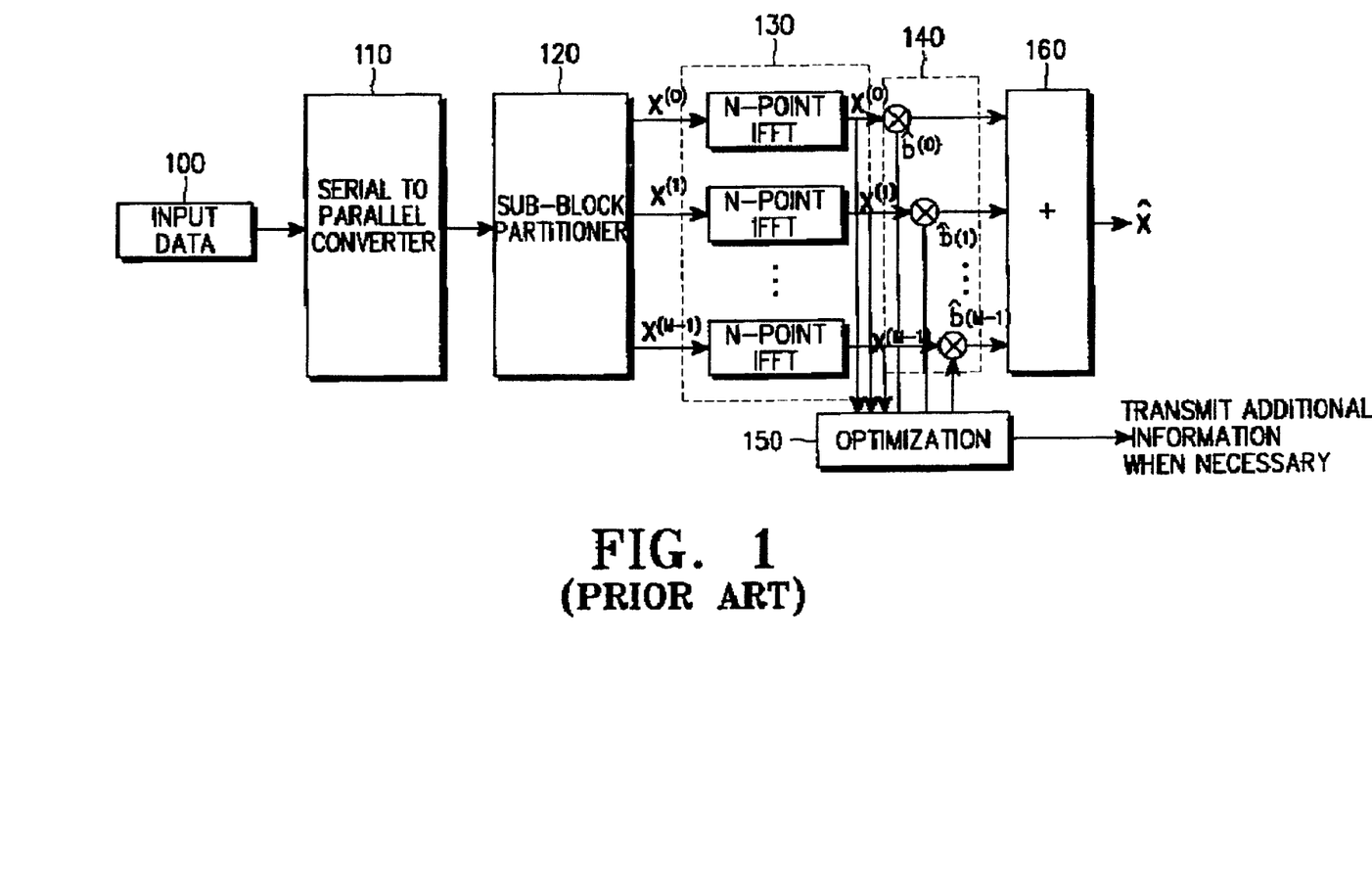
FIG. 1 is a block diagram illustrating a partial transmit sequence (PTS) scheme.

FIG. 1 is a conventional block diagram illustrating an apparatus for partial transmit sequence (PTS). As shown in FIG. 1, input data which is input as the unit of length N by a data input block 100, is converted into parallel in the serial-to-parallel converter 110. The output of the serial-to-parallel converter 110 is partitioned into M sub-blocks and assigned to each corresponding carrier having predetermined intervals where "0" is assigned by a certain "0" inserter (not shown) into the rest position in order not to overlap each other by the sub-block partitioner 120. Accordingly, a receiver is able to detect and decode each data block transmitted using the carriers assigned in order not to overlap. Each N-point IFFT 130 is then performed on each data block of length N including both corresponding M sub-block data and "0" values transmitted from the sub-block partitioner 120. The output of each N-point IFFT 130 is optimized and transformed corresponding to phase factors for PAPR by a predetermined optimal algorithm in the optimizer 150. The phase factors are multiplied by the outputs of each N-point IFFT 130 by corresponding multipliers 140. Accordingly, the minimum PAPR can be generated by adding each output of the multipliers multiplied by the output of the corresponding phase factors and N-point IFFTs 130 bit by bit. That is, serial data to be transmitted is divided into data blocks of length N and the data of each data block are distributed in M sub-blocks of length N so that N/M data are assigned to each sub-block with predetermined intervals to avoid overlap, and 0s are filled in the remainder of the sub-blocks.

Figure 2:
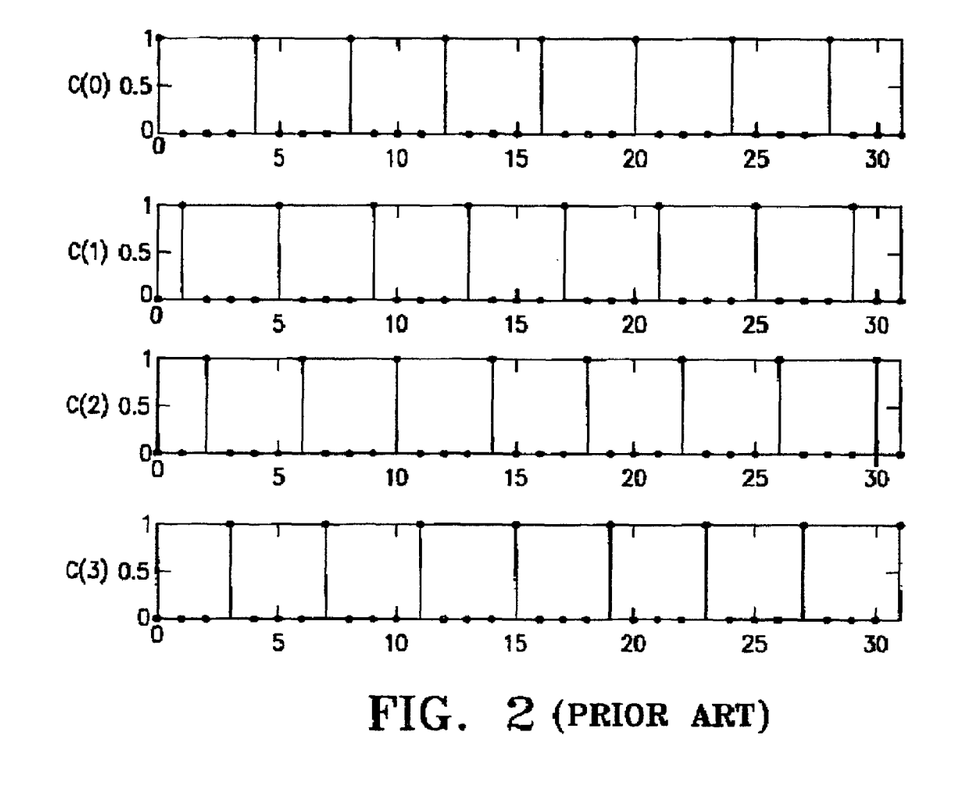
FIG. 2 illustrates an example of interleaved sub-block partitioning for N=32 and M=4.

The PTS scheme applies flexibly according to its sub-block partition methods: interleaved sub-block partition, adjacent sub-block partition, and pseudorandom sub-block partition. According to the interleaved sub-block partition method shown in FIG. 2, carriers are spaced from each other by an identical interval M such that each sub-block is not overlapped with any other sub-block. An input data block of length N is partitioned into M, the number of sub-blocks, and each partitioned data block is assigned to corresponding M sub-block of length N respectfully. As the rest of each M sub-block where the partitioned data is not assigned is to be "0"s, and therefore non-zero data occur in every period of M in the sub-blocks for each N point IFFT, repeatedly. Hence, the Cooley-Tukey IFFT algorithm can be used and as a result, much less computations are required than in the other sub-block partition methods. Yet, the periodicity of non-zero data increases auto-correlation, deteriorating PAPR reduction performance. The required numbers of complex multiplications and additions for the interleaved sub-block partition method is calculated by $$n_{mul} = \left(\frac{N}{2M}\log_2\frac{N}{M} + N\right) \times M = \frac{N}{2}\log_2 L + MN \quad (2)$$

$$n_{add} = \left(\frac{N}{M}\log_2\frac{N}{M} + N\right) \times M = N\log_2 L$$

where N is the number of carriers where the partitioned data block is assigned (L=N/M) and M is the number of sub-blocks.

Figure 3:
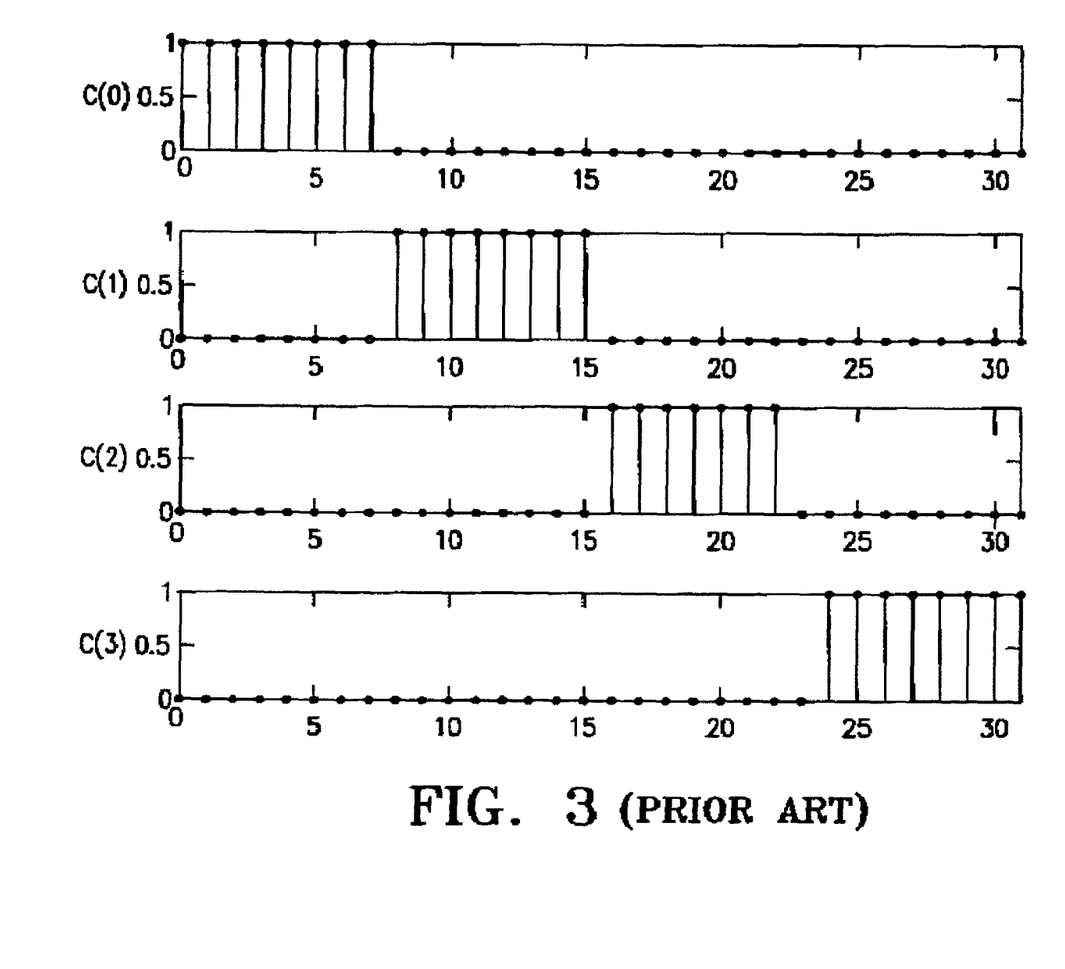
FIG. 3 illustrates an example of adjacent sub-block partitioning for N=32 and M=4.

In the adjacent sub-block partitioning method shown in FIG. 3, N/M carriers are arranged consecutively with no sub-block overlapping with any other sub-block. Since there is no data periodicity, a typical IFFT algorithm applies. Thus, the adjacent sub-block partitioning method requires a greater volume of computation but shows better performance than the interleaved sub-block partitioning method. The required computation volume for the adjacent sub-block partitioning method is calculated by $$n_{mul} = \left(\frac{N}{2}\log_2 N\right) \times M \quad (3)$$

$$n_{add} = (N\log_2 N) \times M$$

Figure 4:
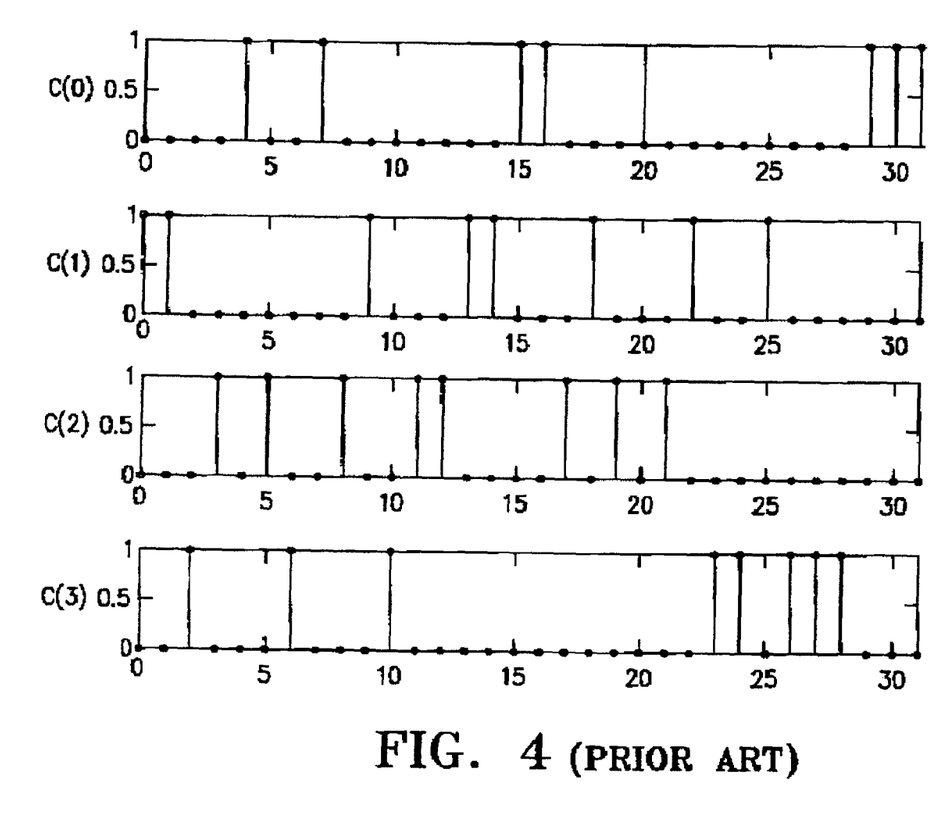
FIG. 4 illustrates an example of pseudorandom sub-block partitioning for N=32 and M=4.

In the pseudorandom sub-block partitioning method shown in FIG. 4, carriers are arranged randomly in each sub-block that does not overlap with any other sub-block. One thing to be noted is that each block is assigned to the same number of carriers. Due to very low auto-correlation, the pseudorandom sub-block partitioning method shows much better PAPR reduction performance than the other two methods, with the same volume of computation as the adjacent sub-block partitioning method.

Table 1 below lists computation volumes for the above three sub-block partitioning methods when N=256 and M varies.

TABLE 1

A Comparison between Complex Computation Volumes for Three Sub-block Partitioning Methods of PTS

| M | Interleaved | | Adjacent, Pseudorandom | |
|---|---|---|---|---|
| | Multiplication | Addition | Multiplication | Addition |
| 1 | 1280 | 2048 | 1024 | 2048 |
| 2 | 1408 | 1792 | 2048 | 4096 |
| 4 | 1792 | 1536 | 4096 | 8192 |
| 8 | 2688 | 1280 | 8192 | 16384 |
| 16 | 4608 | 1024 | 16384 | 32768 |

Figure 5:
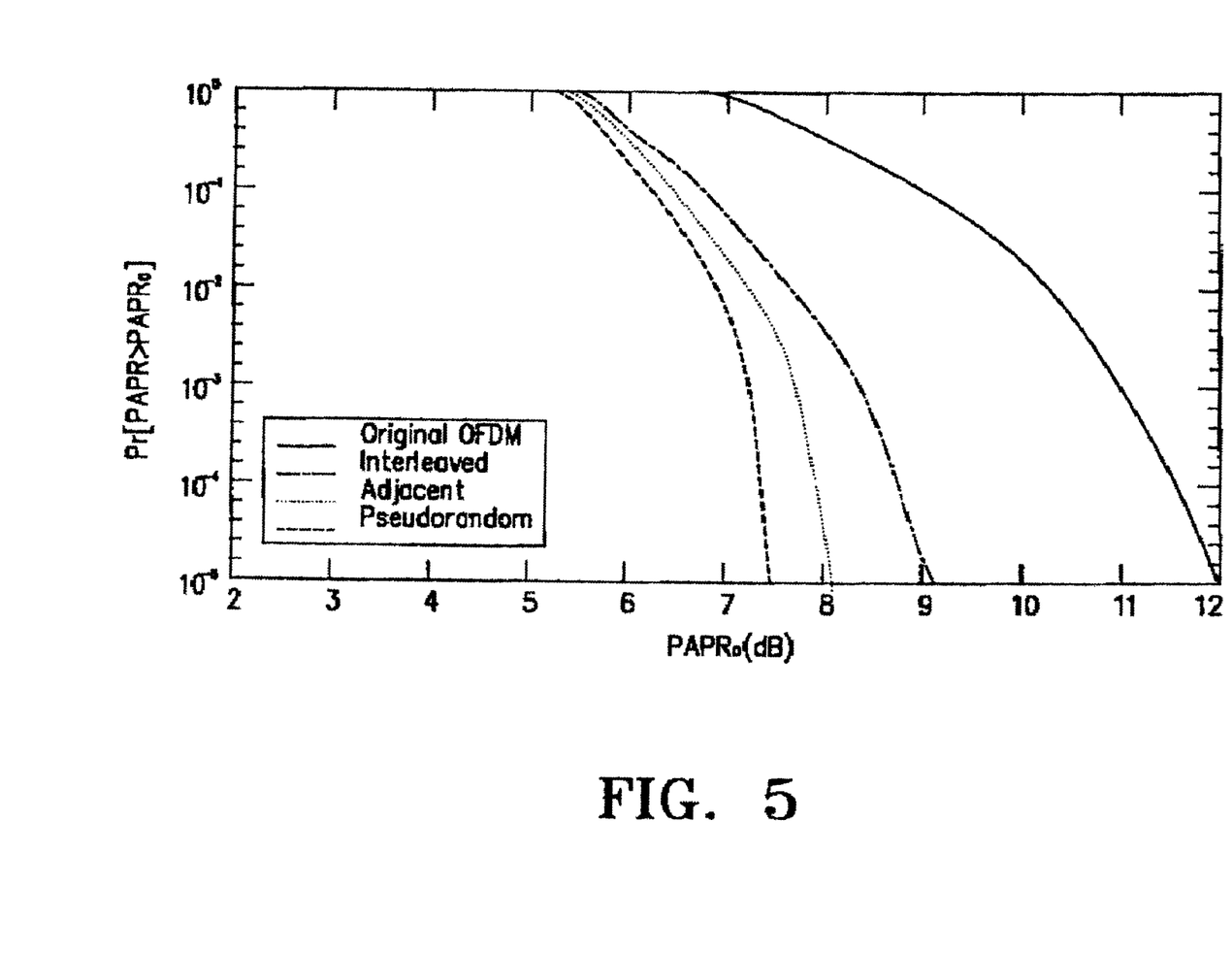
FIG. 5 illustrates a graph of a complementary cumulative distribution function for the PAPR of an OFDM signal.

FIG. 5 illustrates the PAPR reduction performance for the three sub-block partitioning methods (for reference, CCDF (Complementary Cumulative Distribution Function) represents the probability that PAPR of an OFDM symbol exceeds an arbitrary reference level $PAPR_0$, i.e., CCDF=Pr (PAPR>$PAPR_0$) indicating a probability of the PAPR of an OFDM signal larger than $PAPR_0$). According to FIG. 5, the pseudorandom sub-block partitioning method shows high performance, whereas the interleaved sub-block partitioning method shows low performance, comparitively. Therefore, these three methods are in a trade-off relation in terms of computation volume and performance. Aside from the three methods, there is also a concatenated pseudorandom sub-block partitioning method which is a combination of the interleaved and pseudorandom methods in theory. According to the concatenated pseudorandom sub-block partitioning method, carriers are arranged in an N/C portion of a sub-block (C is a concatenation factor) in the same manner as the pseudorandom sub-block partition method and then the N/C portion of the sub-block is duplicated in the remainder of the data block of length L. As a whole, pseudorandom carrier arrangements are interleaved.

Concerning computation volume and performance, the concatenated pseudorandom sub-block partitioning method is between the interleaved and pseudorandom methods though its computation volume and performance differ depending on the concatenation factor C. The computation volume and performance are in a trade-off relation. Therefore, this concatenated pseudorandom sub-block partitioning method increases the scope of choice for the PTS scheme according to required performance and computation volume.

Since each partitioned data block of length L divided from the input data block of length N is assigned to the corresponding M sub-blocks with "0" values, it increases the number of the optimizing operation as much as M*N and the amount of computation for IFFT. Accordingly, it causes an increase of the high peak-to-average power ratio (PAPR) for the conventional art.

SUMMARY OF THE INVENTION

It is, therefore, an object of the present invention to provide a method and apparatus of reducing computation volume and increasing PAPR reduction performance by decreasing the number of PAPR optimizing operations.

It is another object of the present invention to provide a method and apparatus of reducing interference between data by multiplying data output by an orthogonal coefficient.

The above and other objects can be achieved by providing a novel sub-block partitioning method for PAPR reduction in a PTS OFDM scheme. In an OFDM transmitting apparatus for peak power reduction according to the present invention, an interleaved sub-block partitioner partitions an input data block of length N into M, the number of sub-block, and distributes the data of each partitioned data block in M sub-blocks one by one rotationally. M IFFTs perform N/M-point IFFT on N/M data assigned to each of the M sub-blocks and M coefficient multipliers multiply the N/M data output from each IFFT by corresponding a predetermined coefficients to give orthogonality to the frequency components of the N/M output data. A phase factor optimizer optimizes M phase factors to minimize a PAPR using the N/M output values of each coefficient multiplier. M multipliers multiply the optimized M phase factors by the outputs of the coefficient multipliers. A transmitter sums the outputs of the M multipliers on a symbol-to-symbol basis in the same positions and transmits the sum.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

While interleaved sub-block partitioning is optimum for the PTS scheme in computation volume, pseudorandom sub-block partitioning shows the best performance in PAPR reduction. Thus, the PAPR reduction performance and the computation volume are in a trade-off relation. For clarity of description, a sub-block partitioning method for the PTS scheme according to the present invention will be termed "Interleave-and-Transmit-L-sample" (hereinafter, ITL).

A mathematical analysis of the ITL method is set forth below. Considering the ITL method, the elements of each vector $X^{(m)}$ ($0 \leq m \leq M-1$) on the basis of the conventional interleaved sub-block partitioning have periodicity expressed as $$X_n^{(m)} = \begin{cases} \text{non-zero:} & \text{if } n = m, M+m, 2M+m, \ldots, (L-1)M+m \\ 0: & \text{otherwise} \end{cases} \quad (4)$$

where L=N/M. By applying an IFFT formula to each sub-block, a time domain signal is given by $$x_n^{(m)} = \frac{1}{N}\sum_{k=0}^{N-1} X_k^{(m)} e^{j2\pi nk/N} \quad (5)$$

$$= \frac{1}{N}\sum_{l=0}^{L-1} X_{Ml+m}^{(m)} e^{j2\pi n(Ml+m)/N}$$

$$= e^{j2\pi mn/N} \cdot \frac{1}{N}\sum_{l=0}^{L-1} X_{Ml+m}^{(m)} e^{j2\pi nMl/N}$$

$$= \frac{1}{M} e^{j2\pi mn/N} \cdot \frac{1}{L}\sum_{l=0}^{L-1} X_{Ml+m}^{(m)} e^{j2\pi nl/L}, \quad \begin{array}{l} 0 \leq n \leq N-1 \\ 0 \leq m \leq M-1 \end{array}$$

As seen from Eq. (5), for n=0, L, 2L, ..., $$\frac{1}{L}\sum_{l=0}^{L-1} X_{Ml+m}^{(m)} e^{j2\pi nl/L}$$

is the same. The case is also true for n=1, L+1, 2L+1, ... In the interleaved sub-block partitioning method, therefore, N-point IFFT is equivalent to performing L-point IFFT on L non-zero data of the vector $X^{(m)}$, repeating the L-point IFFT values M times, multiplying the repeated values by coefficients $$\frac{1}{M} e^{j2\pi mn/N},$$

and summing the multiplication results. In other words, the N-point IFFT can be expressed as repeating L time domain samples M times and multiplying the repeated L-point IFFT samples by $$\frac{1}{M} e^{j2\pi mn/N}$$

before final time domain samples are achieved. Table 2 lists coefficients to be multiplied in the receiver, on the other hand the inverse number of the coefficients listed Table 2 to be multiplied in the transmitter to give orthogonality to the frequency components of the output data.

TABLE 2

Coefficients for Multiplication in the Receiver

| m\n | 0 | 1 | 2 | ... | L − 1 |
|---|---|---|---|---|---|
| 0 | 1 | 1 | 1 | ... | 1 |
| 1 | 1 | $e^{-j\frac{2\pi}{N}}$ | $e^{-j\frac{4\pi}{N}}$ | ... | $e^{-j\frac{2\pi(L-1)}{N}}$ |
| 2 | 1 | $e^{-j\frac{4\pi}{N}}$ | $e^{-j\frac{8\pi}{N}}$ | ... | $e^{-j\frac{4\pi(L-1)}{N}}$ |
| ... | ... | ... | ... | ... | ... |
| M − 1 | 1 | $e^{-j\frac{2\pi(M-1)}{N}}$ | $e^{-j\frac{4\pi(M-1)}{N}}$ | ... | $e^{-j\frac{2\pi(M-1)(L-1)}{N}}$ |

Figure 6:
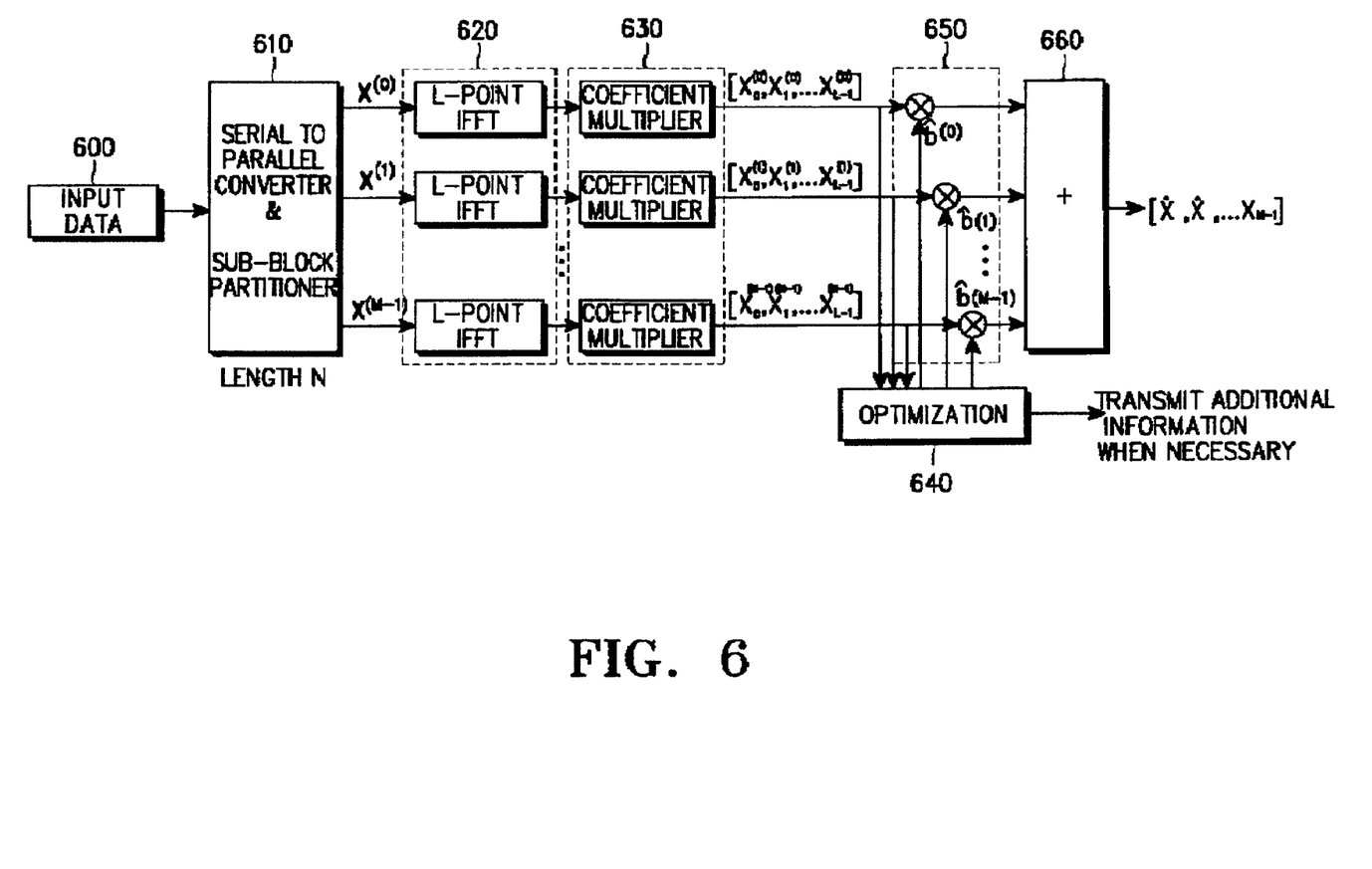
FIG. 6 is a block diagram of an ITL transmitter according to the present invention.
Figure 7:
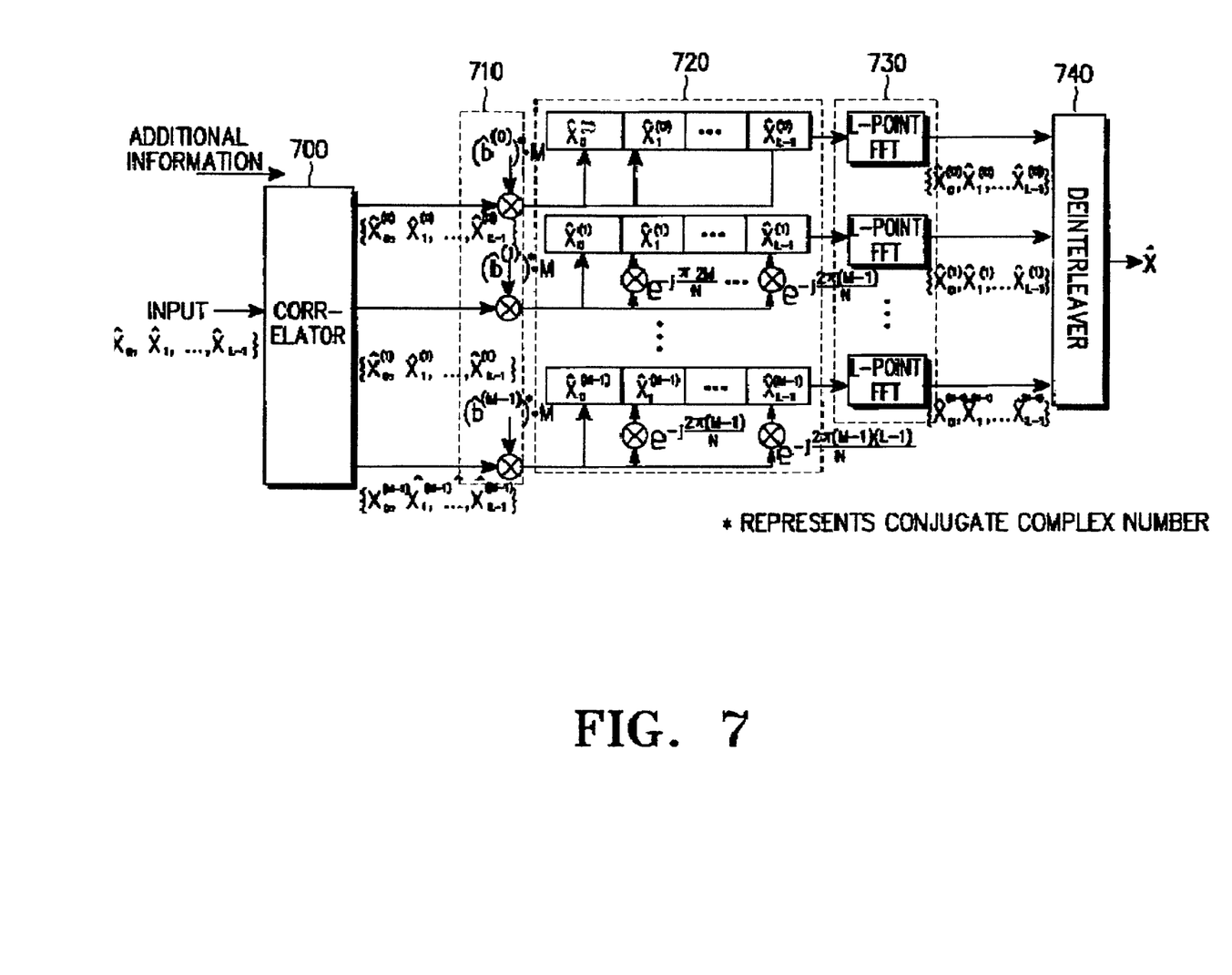
FIG. 7 is a block diagram of an ITL receiver according to the present invention.

FIGS. 6 and 7 are block diagrams of a transmitter and a receiver according to an embodiment of the present invention. Referring to FIG. 6, input data divided from serial data input as the unit of length N by a data input block 600, is converted into parallel and is also assigned to each M sub-block one by one rotationally without having intervals by the serial-to-parallel converter & sub-block partitioner 610. Each L-point IFFT 620 is then performed on each successive data of length L assigned to the corresponding M sub-blocks distributed from the serial-to-parallel converter & the sub-block partitioner 610. The output of each L-point IFFT 620 is multiplied by corresponding orthogonal coefficients by the coefficient multipliers 630 so that a receiver is able to detect and decode each data block transmitted using the carrier assigned in the rotational manner. Phase factors are optimized and transformed, using the outputs of each coefficient multiplier according to a predetermined PAPR optimal algorithm by the optimizer 640. The phase factors are multiplied by the outputs of each coefficient multiplier 630 by the corresponding multipliers 650. The outputs of each multiplier 650 multiplied by the output of the corresponding phase factors and the coefficient multipliers 630 are summed bit by bit in the adder 660. Accordingly, the increased PAPR reduction can be achieved by adding each output of the multipliers 650 due to the decrease number of samples from N to L and the lesser amount of the PAPR optimizing operations.

To implement the scheme presented by Eq. (5), M IFFTs (Inverse Fast Fourier Transformers) perform L-point IFFT on the N/M data in each sub-block. M coefficient multipliers multiply N/M data received from each IFFT by the corresponding coefficients to give orthogonality to the frequency components of the output data of each M IFFT since the output data being overlaid between each sub-block have the same frequency components. The coefficient can be $$\frac{1}{M}e^{j2\pi mn/N} \ (0 \le m \le M-1, 0 \le n \le L-1),$$

and its absolute value can be changed. The optimizer optimizes M phase factors using a predetermined optimization algorithm. The optimized M phase factors are multiplied by the outputs of the coefficient multipliers. Then, the products are summed on a symbol basis by summing sample values at the same time point, thereby achieving a minimized PAPR.

FIG. 7 illustrates an OFDM receiver that receives a signal from the OFDM transmitter. Referring to FIG. 7, a correlator 700 separates the input signal into M sub-blocks of length L using the orthogonality of the frequencies of the signal.

A phase factor eliminator 710 multiplies the data of each sub-block of length L assigned in the rotational manner. Phase factors are optimized and transformed, using the outputs of each coefficient multiplier according to a predetermined PAPR optimal algorithm by the optimizer 640. The phase factors are multiplied by the outputs of each coefficient multiplier 630 by the corresponding multipliers 650. The outputs of each multiplier 650 multiplied by the output of the corresponding phase factors and the coefficient multipliers 630 are summed bit by bit in the adder 660. Accordingly, the increased PAPR reduction can be achieved by adding each output of the multipliers 650 due to the decrease number of samples from N to L and the lesser amount of the PAPR optimizing operations.

To implement the scheme presented by Eq. (5), M IFFTs (Inverse Fast Fourier Transformers) perform L-point IFFT on the N/M data in each sub-block. M coefficient multipliers multiply N/M data received from each IFFT by the corresponding coefficients to give orthogonality to the frequency components of the output data of each M IFFT since the output data being overlaid between each sub-block have the same frequency components. The coefficient can be $$\frac{1}{M}e^{j2\pi mn/N} \ (0 \le m \le M-1, 0 \le n \le L-1),$$

and its absolute value can be changed. The optimizer optimizes M phase factors using a predetermined optimization algorithm. The optimized M phase factors are multiplied by the outputs of the coefficient multipliers. Then, the products are summed on a symbol basis by summing sample values at the same time point, thereby achieving a minimized PAPR.

FIG. 7 illustrates an OFDM receiver that receives a signal from the OFDM transmitter. Referring to FIG. 7, a correlator 700 separates the input signal into M sub-blocks of length L using the orthogonality of the frequencies of the signal.

A phase factor eliminator 710 multiplies the data of each sub-block of length L by a corresponding inverse phase factor. M inverse coefficient multipliers 720 use $e^{-j2\pi mn/N}$ ($0 \le m \le M-1, 0 \le n \le L-1$) to remove orthogonality from the frequency components of L signals in each sub-block. M FFTs (Fast Fourier Transformers) 730 perform L-point FFT on the signals received from the inverse coefficient multipliers. A deinterleaver 740 deinterleaves the signals received from the L-point FFTs, thereby recovering the original signal.

The transmitter obtains L consecutive time domain samples for each sub-block by one L-point IFFT operation and L complex multiplications. Since demodulation is carried out in the reverse order of the modulation, the receiver demodulates each sub-block by L complex multiplications and one L-point FFT. Therefore, the requirement of computation for the transmitter and receiver is calculated by $$n_{mul} = \left(\frac{N}{2M}\log_2\frac{N}{M} + \frac{N}{M}\right) \times M = \frac{N}{2}\log_2 L + N \quad (6)$$

$$n_{add} = \left(\frac{N}{M}\log_2\frac{N}{M}\right) \times M = N\log_2 L$$

Let us compare the conventional interleaved sub-block partitioning method with the present invention in terms of computation volume, keeping in mind that Cooley-Tuckey IFFT is applied to modulation related with the interleaved method and typical N-point FFT is used for demodulation. Table 3 shows the comparison results. Here, the number of sub-carriers per symbol is 256 and the number of sub-blocks varies up to 16.

TABLE 3

A Comparison between the Interleaved Method and the ITL Method in terms of Complex Computation

| | Interleaved | | | | ITL | | | |
| --- | --- | --- | --- | --- | --- | --- | --- | --- |
| | Transmitter | | Receiver | | Transmitter | | Receiver | |
| M | Multiplication | Add | Multiplication | Add | Multiplication | Add | Multiplication | Add |
| 1 | 1280 | 2048 | 1024 | 2048 | 1280 | 2048 | 1280 | 2048 |
| 2 | 1408 | 1792 | 2048 | 4096 | 1152 | 1792 | 1152 | 1792 |
| 4 | 1792 | 1536 | 4096 | 8192 | 1024 | 1536 | 1024 | 1536 |
| 8 | 2688 | 1280 | 8192 | 16384 | 896 | 1280 | 896 | 1280 |
| 16 | 4608 | 1024 | 16384 | 32768 | 768 | 1024 | 768 | 1024 |

As noted from Table 3, as M increases, computation volume decreases in the ITL method and increases in the interleaved method. For M=8, complex multiplications for the transmitter in the ITL method are about an eighth of those in the interleaved method and complex multiplications for the receiver in the ITL method are about a ninth of those in the interleaved method. For M=16, the difference in computation volume between the interleaved method and the ITL method gets wider. Hence, it can be said that the ITL method is superior to the interleaved method as well as the other conventional methods in computation volume. Now, a description will be made of improved system performance in the present invention.

Figure 8:
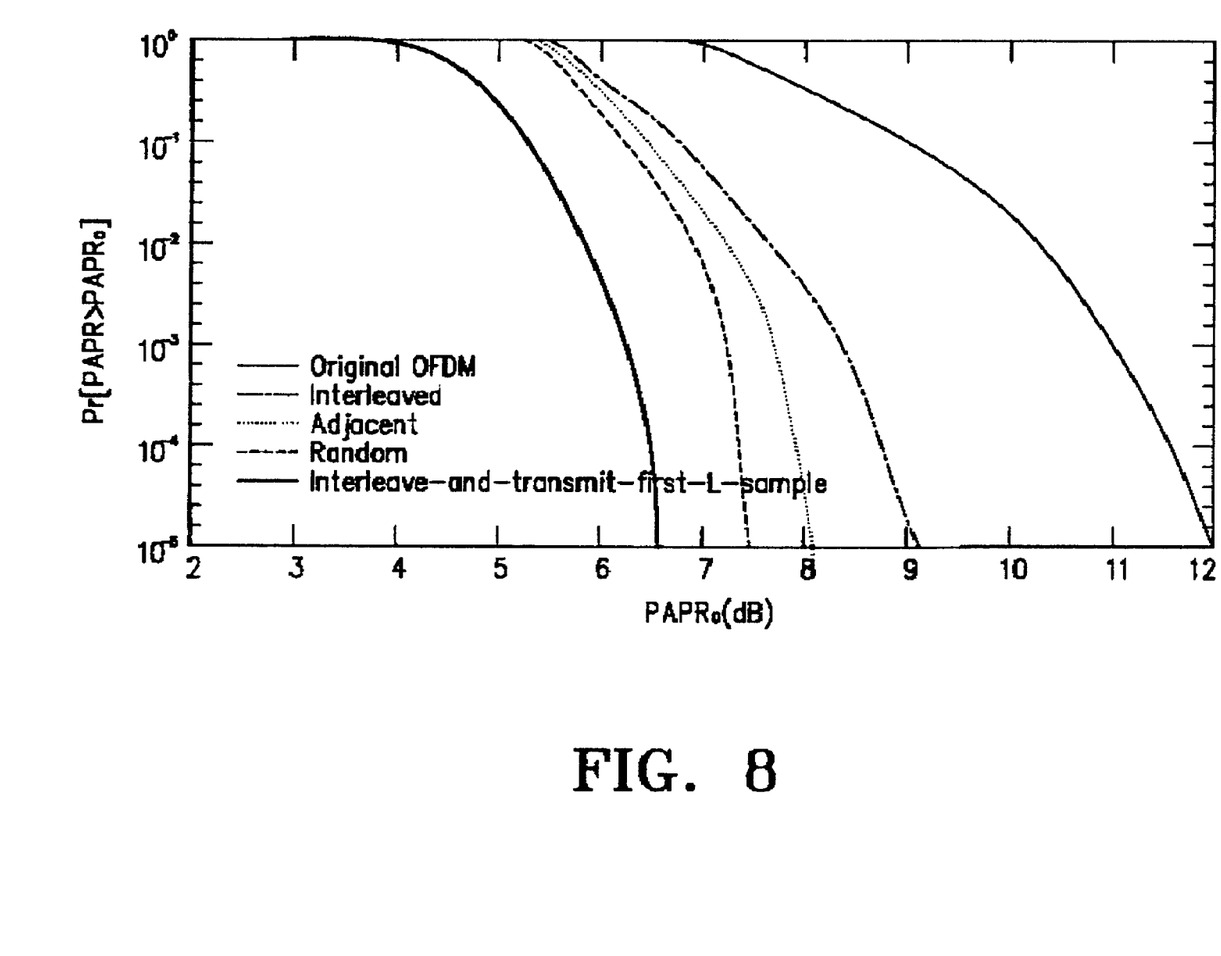
FIG. 8 illustrates a graph of a comparison between the conventional sub-block partitioning methods and an ITL sub-block partitioning method according to the present invention in terms of PAPR reduction performance.

FIG. 8 illustrates the results of a computer-aided simulation for the ITL method. The simulation was carried out under the conditions that a random QPSK symbol is modulated with 128 carriers (N=128), the modulation symbol is divided into 4 sub-blocks (M=4), and optimized phase factors $b^{(m)}$ are $\{\pm1, \pm j\}$.

It is noted from FIG. 8 that a PAPR of 0.001% (=$10^{-5}$) is reduced by 1 dB or more in the ITL method as compared to the pseudorandom method. This is because the number of time domain samples for which phase factors must be optimized is only L (=N/M) in the ITL method whereas it is N in the conventional methods. That is, the decrease of the number of samples from N to L reduces the PAPR remarkably. For example, if N=256 and M=16, the number of time domain samples is 16 in the ITL method, while it is 256 in the conventional methods. In cases where the optimized phase factors for the ITL method are applied to the conventional methods, at least one of 240 (=256−16) time domain samples exhibits a high peak power, thereby increasing the PAPR.

Figure 9:
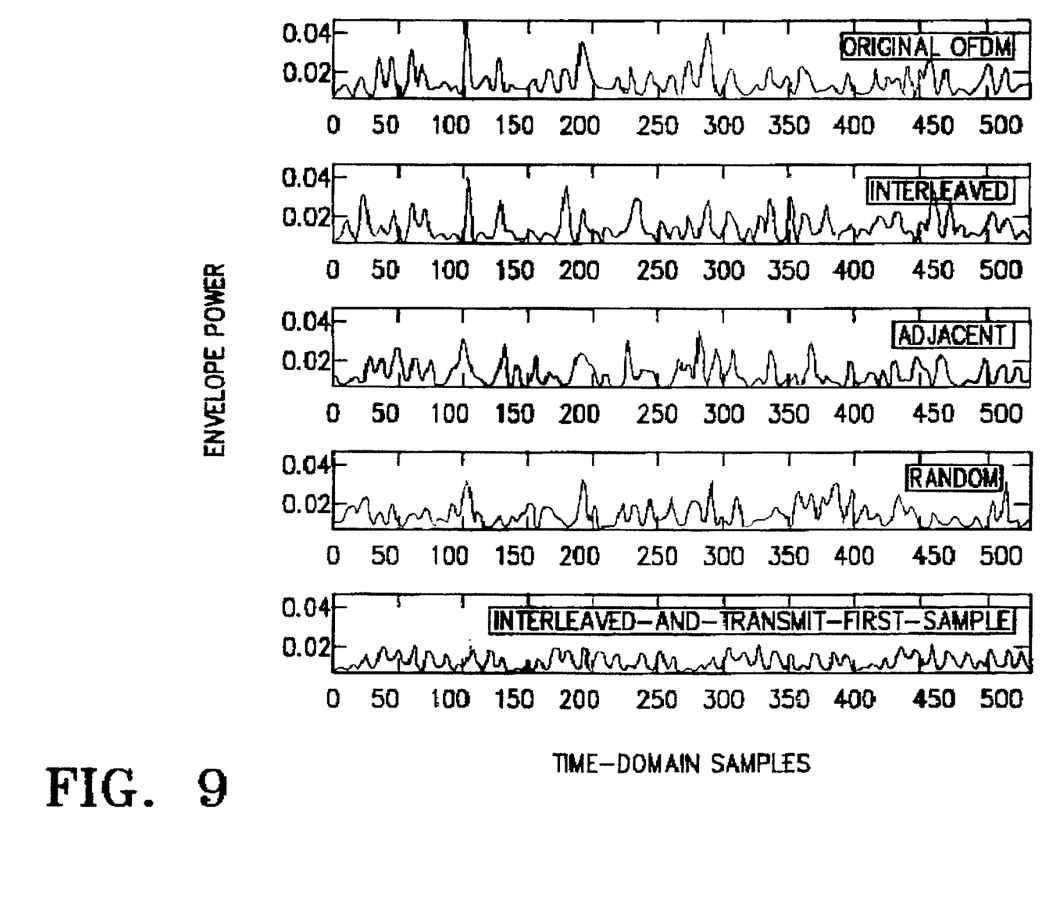
FIG. 9 illustrates a comparison between the conventional sub-block partitioning methods and the ITL sub-block partitioning method according to the present invention in terms of time domain samples.

Therefore, optimized phase factors differ in the ITL method and the conventional methods. This leads to a big difference in PAPR between the methods. A survey of time domain samples in the ITL method will show how much the ITL method improves system performance. FIG. 9 illustrates a comparison between an original OFDM and each sub-block partition method.

While recent research efforts have been expended toward the pseudorandom sub-block partitioning method having a high computation requirement but exhibiting the best performance among the three sub-block partitioning methods for the PTS scheme, the ITL sub-block partitioning method shows far better PAPR reduction performance than the interleaved sub-block partitioning method and the pseudorandom sub-block partitioning method. Furthermore, since a transmitter/receiver according to the present invention requires a less computation volume than that of the conventional methods, hardware complexity is reduced and power consumption become low, which makes the transmitter/receiver for the present invention suitable for a mobile terminal. Considering that OFDM will be adopted increasingly for wide usage in wireless communication applications as well as wired communication applications, the present invention is very significant in that it is effective in PAPR reduction being a conventional challenging issue in many studies.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An OFDM (Orthogonal Frequency Division Multiplexing) transmitting apparatus where serial input data is converted to parallel data blocks of length N, comprising:

a rotational sub-block partitioner for partitioning the input data block of length N into M, the number of sub-block, and distributing the partitioned data of length L (N/M) into M sub-blocks one by one rotationally;

M IFFTs (Inverse Fast Fourier Transformers) for performing L-point IFFT on the successive N/M data assigned to each M sub-block;

M coefficient multipliers for multiplying the N/M data output from each IFFT by predetermined coefficients to give orthogonality to the frequency components of the N/M data;

a phase factor optimizer for optimizing M phase factors to minimize a PAPR (Peak-to-Average Power Ratio) using the N/M output values of each coefficient multiplier;

M multipliers for multiplying the optimized M phase factors by the corresponding outputs of the coefficient multipliers; and an adder for summing the outputs of the M multipliers on a symbol-to-symbol basis.

2. The OFDM transmitting apparatus of claim 1, wherein the predetermined coefficient for the M coefficient multipliers is $e^{2\pi mn/N}$ ($0 \leq m \leq M-1$, $0 \leq n \leq L-1$).

3. The OFDM transmitting apparatus of claim 1, wherein the predetermined coefficient for the M coefficient multipliers is $e^{-2\pi mn/N}$ ($0 \leq m \leq M-1$, $0 \leq n \leq L-1$).

4. The OFDM transmitting apparatus of claim 1, wherein ($\pm 1, \pm j$) are used as the phase factors.

5. An OFDM receiving apparatus for receiving a signal from an OFDM transmitting apparatus, comprising:
a correlator for separating a received signal into M sub-blocks using the orthogonality of frequencies in the signal;
a phase factor eliminator for multiplying the separated data of length L from each sub-block by a predetermined inverse phase factor;
M inverse coefficient multipliers for multiplying each of the output data with length L received from the phase factor eliminator by predetermined coefficients to eliminate orthogonal components from frequency components of the output data;
M FFTs (Fast Fourier Transformers) for performing L-point FFT on the output data with length L received from each inverse coefficient multiplier; and
a deinterleaver for deinterleaving the output data received from the FFTs to recover an original data of the received output data.

6. The OFDM receiving apparatus of claim 5, wherein the predetermined coefficient for the M inverse multipliers is $e^{j2\pi mn/N}$ ($0 \leq m \leq M-1$, $0 \leq n \leq L-1$).

7. The OFDM receiving apparatus of claim 5, wherein the predetermined coefficient for the M inverse multipliers is $e^{-j2\pi mn/N}$ ($0 \leq m \leq M-1$, $0 \leq n \leq L-1$).

8. An OFDM receiving apparatus for receiving a signal of which the peak power is decreased by performing L-point IFFT by $$\begin{aligned}
x_n^{(m)} &= \frac{1}{N}\sum_{k=0}^{N-1} X_k^{(m)} e^{j2\pi nk/N} \\
&= \frac{1}{N}\sum_{l=0}^{L-1} X_{Ml+m}^{(m)} e^{j2\pi n(Ml+m)/N} \\
&= e^{j2\pi mn/N} \cdot \frac{1}{N}\sum_{l=0}^{L-1} X_{Ml+m}^{(m)} e^{j2\pi nMl/N} \\
&= \frac{1}{M} e^{j2\pi mn/N} \cdot \frac{1}{L}\sum_{l=0}^{L-1} X_{Ml+m}^{(m)} e^{j2\pi nl/L}, \quad \begin{array}{l} 0 \leq n \leq N-1 \\ 0 \leq m \leq M-1 \end{array}
\end{aligned}$$

and using a predetermined coefficient multiplier, the apparatus comprising:
a correlator for separating a received signal of length into M sub-blocks using the orthogonality of frequencies in the signal;
a phase factor eliminator for multiplying the separated data with Length L from each sub-block by a predetermined inverse phase factor;
M inverse coefficient multipliers for multiplying each of the output data with length L of each sub-block received from the phase factor eliminator by predetermined coefficients to eliminate orthogonal components from the frequency components of the signal;
M FFTs for performing L-point FFT on the output data with length L received from each inverse coefficient multiplier; and
a deinterleaver for deinterleaving signals received from the FFTs to recover an original signal of the received signal.

9. A method of transmitting an OFDM signal from an OFDM transmitting apparatus, comprising the steps of:
dividing serial data to be transmitted into data blocks of length N;
distributing the data of the divided data block of length N to M sub-blocks one by one rotationally;
performing L(N/M)-point IFFT on distributed N/M data assigned to each M sub-block;
multiplying the N/M data output from each IFFT by predetermined coefficients to give orthogonality to the frequency components of the N/M output data;
generating optimal M phase factors to minimize a PAPR using the coefficient multiplication results;
multiplying the M optimized phase factors by the multiplication results; and
summing the products of the phase factors and the coefficient multiplication results on a symbol-to-symbol basis.

10. A method of receiving a signal from an OFDM receiving apparatus, comprising the steps of:
separating a received signal of length N into M sub-blocks using the orthogonality of frequencies in the signal;
multiplying the separated data of length L from each sub-block by a predetermined inverse phase factor;
multiplying each output data of length L from the M sub-blocks by predetermined coefficients to eliminate orthogonal components from frequency components of the output data;
performing L(N/M)-point FFT on the multiplied data of length L; and
deinterleaving the L-point FFT output data to recover an original data.

11. An OFDM transmitting apparatus, comprising:
a rotational sub-block partitioner for distributing parallel data blocks of length N to M sub-blocks one by one rotationally so that N/M data of length L is assigned to each sub-block;
M IFFTs for performing L(N/M)-point IFFT on the N/M data assigned to each of the M sub-blocks;
M coefficient multipliers for multiplying the N/M data output from each IFFT by predetermined coefficients to give orthogonality to the frequency components of the N/M output data;
a phase factor optimizer for generating M phase factors to minimize a PAPR using the output of each coefficient multiplier;
M multipliers for multiplying the optimized M phase factors by the outputs of the coefficient multipliers; and
an adder for summing the outputs of the M multipliers on a symbol-to-symbol basis.

12. An apparatus of recovering original data in OFDM (Orthogonal Frequency Division Multiplexing) system, comprising:
a rotational sub-block partitioner for partitioning the input data block of length N into M, the number of sub-block, and distributing the partitioned data of length L (N/M) into M sub-blocks one by one rotationally;
M IFFTs (Inverse Fast Fourier Transformers) for performing L-point IFFT on the successive N/M data assigned to each M sub-block;
M coefficient multipliers for multiplying the N/M data output from each IFFT by predetermined coefficients;
M inverse coefficient multipliers for multiplying each output data of length L received from the phase factor eliminator by the inverse number of the predetermined coefficients transmitted from the M coefficient multipliers; and M FFTs (Fast Fourier Transformers) for performing L-point FFT on the output data of length L received from the corresponding inverse coefficient multipliers.

13. A method of recovering original data in OFDM (Orthogonal Frequency Division Multiplexing) system, comprising the steps of:
   distributing the input data of the data block of length N to M sub-blocks one by one rotationally;
   performing L(N/M)-point IFFT on successive N/M data assigned to the corresponding M sub-blocks;
   multiplying the N/M data output from each IFFT by predetermined coefficients;
   multiplying each output data of length L from the M sub-blocks by inverse number of the coefficients generated; and
   performing L(N/M)-point FFT on the multiplied data of length L.

* * * * *